(12) United States Patent
Gibart

(10) Patent No.: US 7,203,885 B2
(45) Date of Patent: Apr. 10, 2007

(54) SAFETY PROTOCOL FOR INDUSTRIAL CONTROLLER

(75) Inventor: Anthony Gerard Gibart, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 531 days.

(21) Appl. No.: 10/675,476

(22) Filed: Sep. 30, 2003

(65) Prior Publication Data

US 2005/0071725 A1    Mar. 31, 2005

(51) Int. Cl.
*H03M 11/00* (2006.01)
(52) U.S. Cl. .................. 714/755; 714/758; 714/781
(58) Field of Classification Search ............... 714/755, 714/758, 785, 763, 776, 704, 781
See application file for complete search history.

(56) References Cited

U.S. PATENT DOCUMENTS

| | | | | |
|---|---|---|---|---|
| 4,994,993 A | * | 2/1991 | Asghar et al. .............. | 708/533 |
| 5,438,621 A | * | 8/1995 | Hornak et al. .............. | 380/43 |
| 5,526,357 A | * | 6/1996 | Jandrell ...................... | 370/346 |
| 6,047,396 A | * | 4/2000 | Hillis .......................... | 714/763 |
| 6,598,197 B1 | * | 7/2003 | Peterson et al. ............ | 714/763 |
| 6,615,387 B1 | * | 9/2003 | Williamson et al. ........ | 714/785 |
| 7,047,475 B2 | * | 5/2006 | Sharma et al. .............. | 714/758 |

* cited by examiner

*Primary Examiner*—Guy Lamarre
*Assistant Examiner*—Fritz Alphonse
(74) *Attorney, Agent, or Firm*—Keith M. Baxter; R. Scott Speroff

(57) ABSTRACT

Messages in a high reliability industrial control system are associated with safety messages that enable reliable detection of data errors caused during transmission of the message over the network. In particular, error detection codes are generated and transmitted along with message data. At a receiving node, an expected EDC is generated and compared to the EDC transmitted over the network to determine whether any data was corrupted.

25 Claims, 5 Drawing Sheets

SAFETY PROTOCOL FOR INDUSTRIAL CONTROLLER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to industrial controllers used for real time control of industrial processes, and in particular, to a high reliability industrial controller appropriate for use in devices intended to protect human health and life.

Industrial controllers are special purpose computers used in controlling industrial processes. Under the direction of a stored control program, an industrial controller examines a series of inputs reflecting the status of the control process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

"Safety systems" are systems intended to ensure the safety of humans working in the environment of an industrial process. Such systems may include, but are not limited to, the electronics associated with emergency stop buttons, interlock switches and machine lockouts. Traditionally, safety systems have been implemented by a set of circuits wholly separate from the industrial control system used to control the industrial process with which the safety system is associated. Such safety systems were originally "hard-wired" from switches and relays, some of which may be specialized "safety relays" allowing comparison of redundant signals and providing internal checking of conditions such as welded or stuck contacts. Safety systems may use switches with dual contacts providing an early indication of contact failure, and multiple contacts may be wired to actuators so that the actuators are energized only if multiple contacts close.

Hard-wired safety systems have proven inadequate as the complexity of industrial processes has increased. This is in part because of the cost of installing and wiring relays and in part because of the difficulty of troubleshooting and maintaining the "program" implemented by the safety system in which the logic can only be changed by rewiring physical relays and switches.

For this reason, there is considerable interest in implementing safety systems using industrial controllers. "High reliability" refers generally to systems that guard against the propagation of erroneous data or signals to a predetermined high level of probability defined by safety certification standards. Such high reliability is obtained by detecting error or fault conditions and entering into a predetermined fault state. High reliability systems may be distinguished from high availability systems, however, the present invention may be useful in both situations, and therefore as used herein, high reliability should not be considered to exclude high availability systems.

High reliability controllers are easier to program and have reduced installation costs because of their ability for use of a high-speed serial communication network eliminating long runs of point-to-point wiring. For a system to have sufficiently high reliability, the system should be sufficiently robust so as to reliably detect errors in transmitting network messages.

Efforts have been undertaken to develop a "safety network" which is a high-speed serial communication network providing greater certainty in the transmission of data. Unfortunately, conventional high-speed serial communication networks commonly used in industrial control are not sufficiently reliable for safety systems. For instance, such networks add a large amount of safety information to each message, which increases the message length and thereby reduces the capacity of the network. This reduced capacity may adversely affect the response time for the industrial controller and/or limit additional reliability enhancing features that might be added to the message to otherwise improve its reliability. If the amount of safety information embedded in the messages of conventional safety networks is decreased, the reliability of error detection is compromised.

What is therefore needed is a high reliability safety network using error detection methods that reliably indicate data corruption while reducing the overall size of messages and increasing network performance.

BRIEF SUMMARY OF THE INVENTION

The present invention provides a network-independent, high-reliability communications system by imposing levels of safety on data that is transmitted over the network while reducing the necessary hardware. The present invention recognizes that safety in data transmission can be achieved with reduced hardware by providing at least one message of data, and providing a compressed representation of the message.

In particular, one aspect of the invention provides a method of communication between a producer node and a consumer node over a high reliability network. First, a message is prepared at the producer node that includes message data, a first error detection code (EDC) based on the message data using a first protocol, and a second EDC based on the message data using a second protocol different than the first protocol. The message is then transmitted to the consumer node. The consumer node receives the message over the network and calculates an expected first EDC based on the received message data using the first protocol, and an expected second EDC corresponding to the received message data using the second protocol. The first and second EDCs are compared to the received first and second EDCs to determine whether data had been corrupted during the transmission of the message.

In accordance with another aspect, the invention provides a method of communication between a producer node and a consumer node over a high reliability network. First actual message data is provided. First and second phantom error detection codes are then generated as compressed representations related to the actual message data. An overall error detection code is generated as a compressed representation of the first and second phantom error detection codes. A message is transmitted from the producer node to the consumer node, the message including the actual message data and the overall error detection code, but not the first and second phantom error detection codes. The message is received over the network at the consumer node, which calculates an expected overall error detection code. The expected error detection code is compared to the received error detection code to determine whether data had been corrupted during the transmission of the message.

The foregoing and other objects and advantages of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

Figure 1:
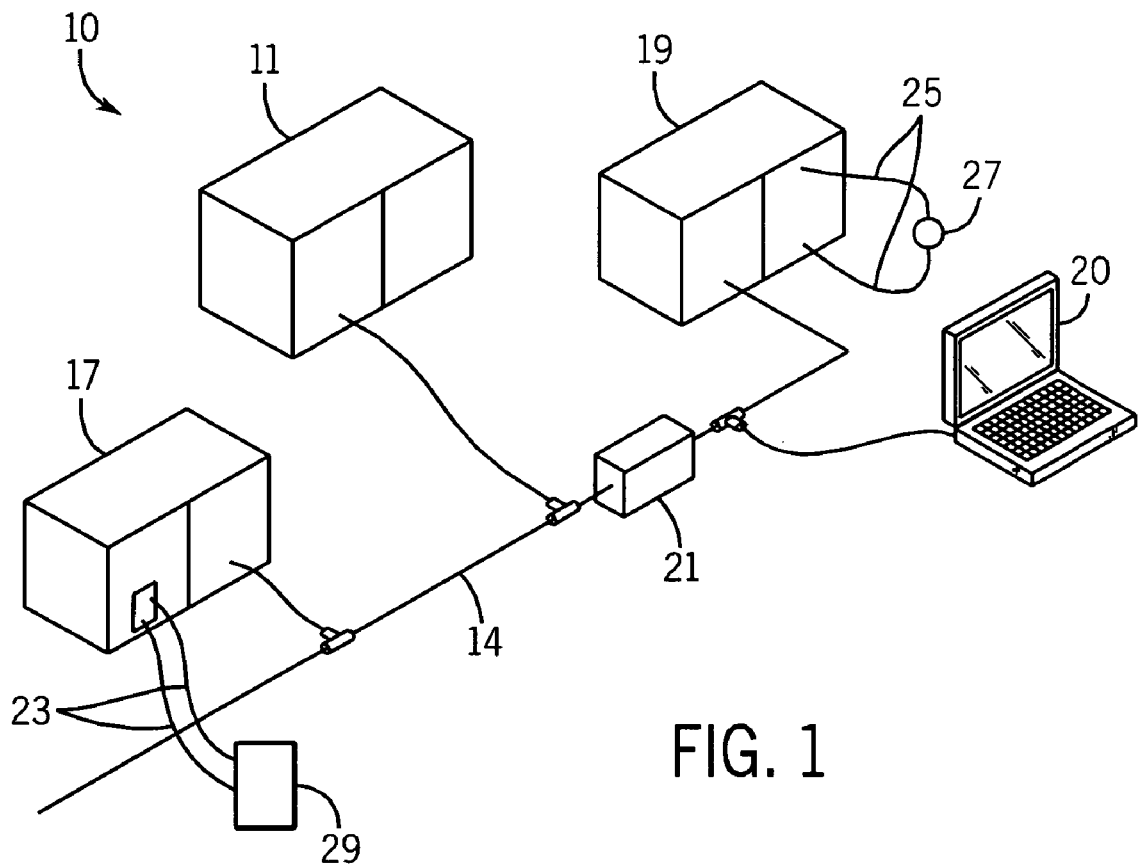
FIG. 1 is a perspective view of a simplified industrial controller using a standard serial communication network linking a central controller with remote input and output circuits and with a remote configuration terminal, such as may be used in the present invention.

Referring now to FIG. 1, a high reliability industrial control system 10 for implementing a safety system with the present invention includes a controller 11 communicating on a high speed serial network 14 with remote input module 17 and remote output module 19. The network 14 may be a standard and commonly available high-speed serial network including but not limited to: Ethernet, DeviceNet, ControlNet, Firewire, FieldBus, or CAN protocol. The network 14 may optionally include a bridge 21 translating between different of the above standard or other protocols. As will be understood from the following, the present invention may be easily adapted to applications that use a bridge.

Input module 17 may accept input signals 23 (on like-designated lines) which are communicated over the network 14 to the industrial controller 11. At the industrial controller 11 the signals 23 may be processed under a control program implementing a safety system (such as a machine lock-out or emergency stop) and further signals sent to the output module 19 which may produce output signals 25 (on like-designated lines) to an actuator 27.

The input signals 23 may come from a switch 29 which maybe any of a variety of devices producing safety input signals including but not limited to emergency stop switches, interlock switches, light curtains and other proximity detectors. The actuator 27 may be a relay, solenoid, motor, enunciator, lamp or other device implementing a safety function. Also connected to the network 14 is a standard computer 20 which may be used as a configuration terminal.

Figure 2:
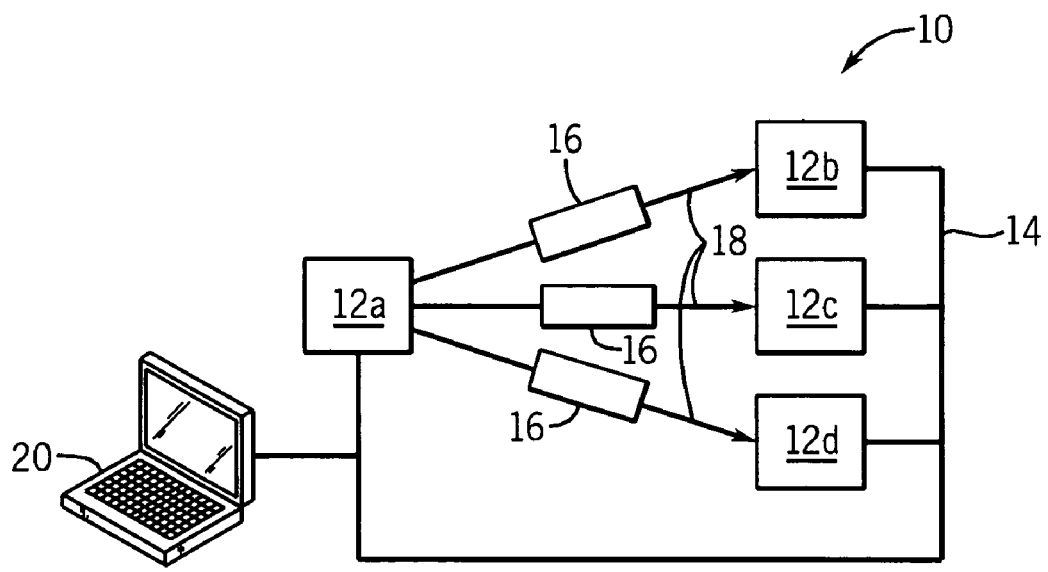
FIG. 2 is a simplified schematic of a network physically connecting nodes of an industrial controller showing messages transmitted from a producer node to consumer nodes.

Referring now to FIG. 2, the control system 10 is schematically illustrated having a number of intercommunicating nodes 12a–12d exchanging messages 16 on a high speed serial network. Nodes 12a–12d may comprise any of switch 29, input module 17, controller 11, output module 19, actuator 27, or any other communications module that is compatible with network 14. Generally, however, each of the nodes 12 includes a processor (not shown) for executing a safety protocol program of the preferred embodiment and a standard network interface circuit (NIC) 51 (FIGS. 3 and 4) used to provide a low level interface between the given node 12 and the network 14. The network 14 may be, for example, one or more standard networks such as Ethernet, DeviceNet, ControlNet, FireWire, or FieldBus. The network 14 may use a single or multiple conductor copper media or may use fiber optics, wireless communication technology, or other well-known alternatives. Such networks 14 allow one or more physical media to interconnect each of the nodes 12 with the messages directed by effective addresses contained in the messages. Network 14 may be an external network, an internal backplane, or the like.

Making use of the protocol of the network 14, a producer node 12a may establish logical connections 18 with other nodes 12b–12d and/or direct messages 16 to particular ones of the other nodes 12b–12d (consumer nodes). The nodes 12 may be, for example, components of the high reliability industrial control system 10 including input or output circuits and a centralized controller. While each of nodes 12b–12d are illustrated as receiving nodes, the preferred embodiment will be described with reference only to receiving node 12b, it being appreciated that the present invention is applicable to other receiving nodes.

Errors may occur in such networks 14 in which a particular message 16 becomes misdirected or otherwise corrupted. For example, a misdirected message 16 may be received by a node 12d for which it was not intended. Such misdirection may occur for a number of reasons including alterations in the bit pattern that provide the implicit address of the message 16 as may be caused by external electromagnetic interference. As another example, a message may reach its intended consumer node though the message data has been corrupted. Such errors may otherwise exhibit no detectable error and, if acted upon, can undermine the reliability of the system.

Traditionally some type of error detection code (EDC) has been used to determine whether the integrity of data has been maintained during message transfer. One of the earlier EDCs included a parity bit, whereby the producer node counts the number of non-zero bits in the message. If the number is even, it sets the parity bit attached to the message.

Otherwise, the bit is cleared. The consumer node then performs the same check on the received data, and compares its computed parity to the parity bit embedded in the message. If the computed parity matches the set parity bit, then the consumer concludes that data integrity was maintained. This method, however, would not detect an error if, for example, an electrical interference with the signals on the network 14 switched two binary representations (i.e. from "ones" to "zeros" or vice versa) as the overall parity of the message would not be changed even though data in the message has been corrupted.

More recently, the use of multi-bit cyclic redundancy codes (CRCs), attached to the end of messages, has proven to be more robust in reliably detecting a greater number of error types, thereby providing greater assurance that a successful check of the CRC is an accurate indication of data integrity. The cyclic redundancy code (CRC) is generally a compressed representation of the message data generated at the producer node. The CRC is attached to the message and transmitted over the network to a consumer node. An expected CRC is then independently computed at the consumer node based on the message data received, and compared to the CRC embedded in the message. A discrepancy between the expected CRC and actual CRC at the consumer module will signify a corruption of the transferred data. The reliability of a CRC depends directly on the method used to compute the CRC. While some CRCs have proven more robust than others in detecting various error types, it has been found that some errors nonetheless go systematically undetected.

Figure 3A:
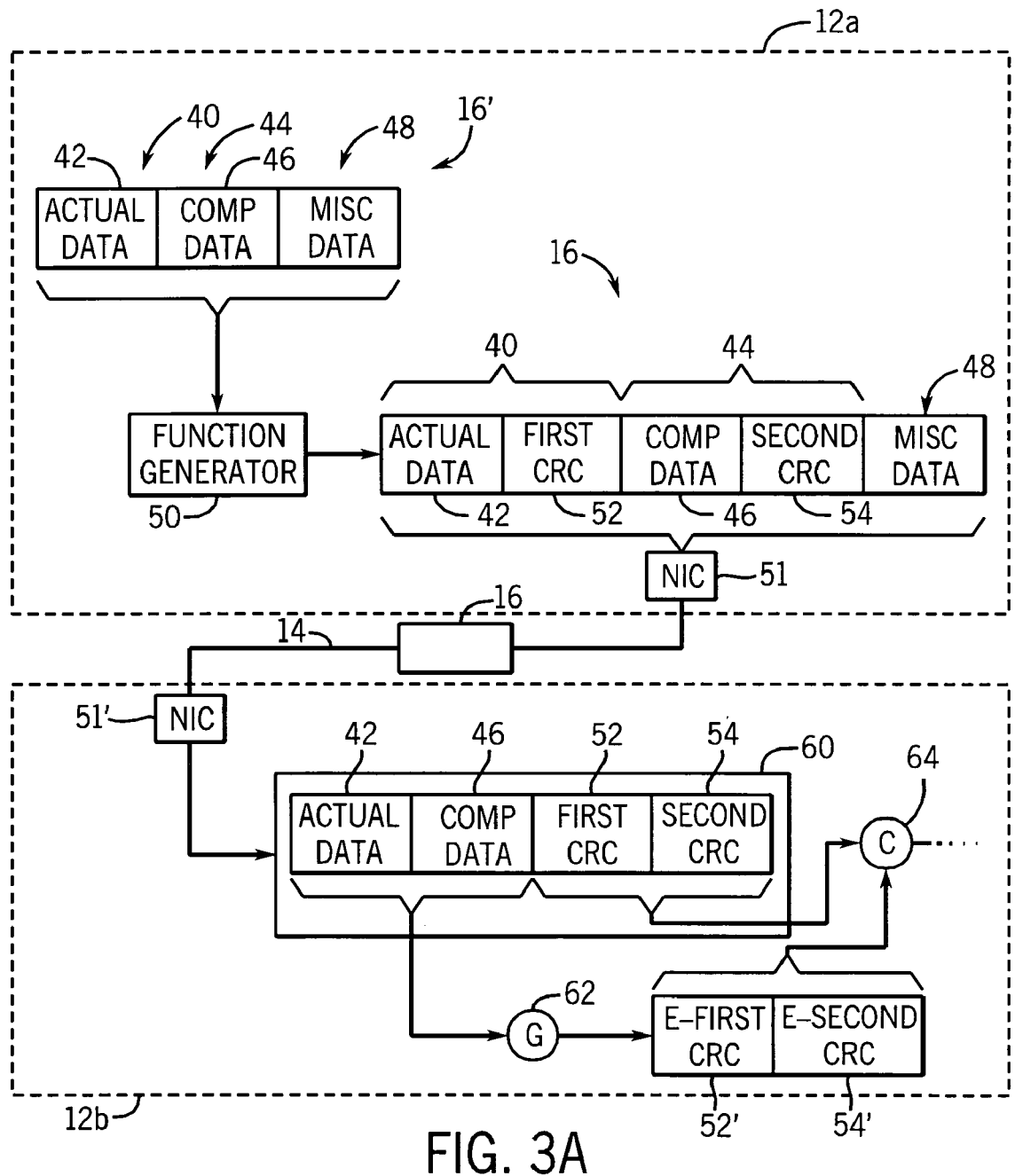
FIG. 3A is a flowchart showing the path of message flow between a producer node and a consumer node in accordance with the preferred embodiment.

Referring now to FIG. 3A, according to one embodiment of the present invention, the producer node 12a compiles an actual data section 40, which includes actual message data 42 that is to be transmitted over the network 14 to consumer nodes 12b. The producer also compiles a complement data section 44 that includes the complement of the message data 46. The complement data 46 may be achieved by, for example, inverting each bit of the message data. The actual data and complement data sections 40 and 44 are attached to the message portion 16' that is to be further refined into message 16 that is to be transmitted over the network. It should be appreciated that while the actual message data 42 is inverted in accordance with the preferred embodiment, the present invention envisions any systematic alteration of the actual message data 42 to produce the complement message data 46. Other miscellaneous data 48 may be included in the message 16' such as a mode byte information and connection data, as understood by those having ordinary skill in the art.

Message portion 16' is then sent to a function generator 50 of producer node 12a. The function generator 50 includes error detection circuitry which adds an additional error detecting code, which is typically a number sequence that may include, for example, a CRC or other compressed representation of the message transmitted by the producer node 12a that can be used at a later time to detect any errors that occurred during the transmission of data over the network 14. In accordance with the preferred embodiment, generator 50 calculates a first CRC 52 for actual message data 42 based upon a predetermined protocol, and includes CRC 52 in actual data section 40. Generator 50 additionally calculates a second CRC 54 for complement message data 46 based upon a predetermined protocol, and includes CRC 54 in complement data section 44. It should thus be appreciated that both CRCs 52 and 54 are said to be "related" or "produced based on" actual message data 42, as the complementary message data 46 has a predetermined relationship to the actual message data.

Preferably, the protocol used to calculate CRC 52 is different than that used to compute CRC 54, though the protocol could be the same. For instance, if the protocol used to calculate CRCs 52 and 54 is different, the two CRCs can both be determined based on the actual message data 42 or complementary message data 46. If the protocol used to calculate the CRCs 52 and 54 is the same, CRC 52 would be calculated directly from the actual message data 42, while CRC 54 would be calculated directly from the complementary data 46.

While the protocol used to calculate CRCs 52 and 54 can include any systematic method for compressing data, the preferred embodiment divides message data 42 and 46 by a predetermined polynomial key to produce a remainder. The remainder provides the CRC for the respective data. For example, it has been determined that suitable polynomial keys include base-16 0x137 and 0x13b. Accordingly, if the CRCs 52 and 54 are calculated using the same protocol applied to different data sections 42 and 46, either key can be applied. Otherwise, if the CRCs use different protocol, one key would be used to produce CRC 52, while the other key would be used to produce CRC 54. While the two polynomial keys described herein have been found to produce sufficiently reliable message data, many other polynomial keys could alternatively be used, such as 0x107 and 0x12f, along with others as appreciated by those having ordinary skill in the art.

It should be appreciated that the base-16 polynomial keys described above can be converted to a base-2 polynomial. For instance, the polynomial 0x137 converts to $X^8+X^5+X^4+X^2+X^1+1$. If the first CRC 52 is calculated directly from the actual message data 42, the polynomial 0x137 is divided into the polynomial formed by the bits of actual message data 42. The remainder is expressed as a set of binary bits stored as the first CRC 52. The polynomial 0x13b converts to $X^8+X^5+X^4+X^3+X^1+1$. If the second CRC 54 is calculated directly from the complementary data 46, the polynomial 0x13b is divided into the polynomial formed by the bits of complement data 46. The remainder is expressed as a set of binary bits, and stored as the second CRC 54.

The message 16 is then communicated over the network via NIC 51 of producer node 12a, which modifies message 16, typically by adding data according to the particular requirements of the protocol of the network 14.

The message 16 is received by network interface circuit (NIC) 51' of consumer node 12b, and message sections 40 and 44 are forwarded to a buffer 60. The actual message data 42 and complementary data 46 are then fed into a generator 62, while the first and second CRCs 52 and 54 are forwarded to a comparator 64. The generator 62 calculates expected first and second CRCs 52' and 54' based on the same protocol used by producer node 12a to determine first and second CRCs 52 and 54, as described above. CRCs 52' and 54' are then fed to comparator 64 and are compared against the actual corresponding CRCs 52 and 54. If there is a match, the message 16 is forwarded to the control program. If there is no match, the high reliability control system 10 can enter a safety state which generally provides a shutting down of portions or all of the high reliability industrial control system 10 according to the predefined safety states for its inputs and outputs.

Figure 3B:
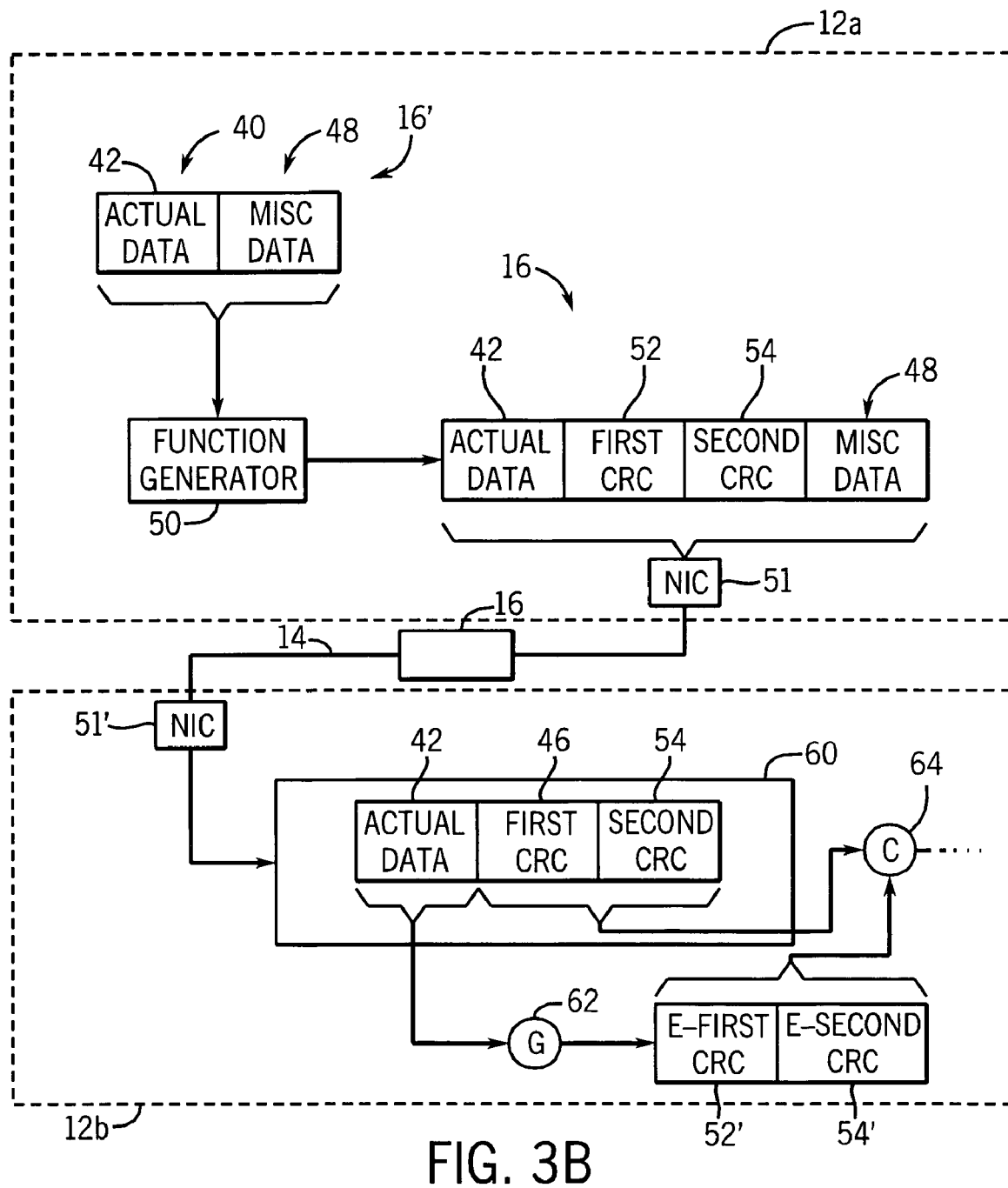
FIG. 3B is a flowchart showing the path of message flow between a producer node and a consumer node similar to that illustrated in FIG. 3A in accordance with an alternate embodiment.

Referring now to FIG. 3B, an alternate embodiment to that described an illustrated above with reference to FIG. 3A recognizes that the data transmitted over the network can be reduced, thereby freeing additional bandwidth for actual message data and increasing the efficiency of the network 14. In particular, producer node 12a can compile a message portion 16' that eliminates complementary data 46, such that the message portion includes actual message data 42 and miscellaneous data 48. The message portion 16' is then communicated to function generator 50, which produces first and second CRCs 52 and 54.

As described above, first CRC 52 is preferably produced based on actual message data 42, while second CRC 54 is produced based on message data complementary to actual message data 42. It should be appreciated that the complementary data can be either produced by producer node 12a and forwarded to function generator, or produced at the function generator 50. However, because the complementary message data is not part of message 16, the complementary message data is said to be virtual message data. CRCs 52 and 54 can be determined using any of the alternative methods described above with reference to FIG. 3A.

Message 16, including the actual message data 42, first CRC 52, second CRC 54, and miscellaneous data 48, is then communicated over the network 14 via NIC 51 of producer node 12a, which modifies message 16, typically by adding data according to the particular requirements of the protocol of the network 14.

The message 16 is received by network interface circuit (NIC) 51' of consumer node 12b, and message data 42, 54, and 54 are forwarded to buffer 60. The actual message data 42 is then fed into a generator 62, while the first and second CRCs 52 and 54 are forwarded to comparator 64. The generator 62 calculates an expected first and second CRCs 52' and 54' based on the same protocol used by producer node 12a to produce CRCs 52 and 54, as described above. CRCs 52' and 54' are then fed to comparator 64 and compared against the actual corresponding CRCs 52 and 54. If there is a match, the message 16 is forwarded to the control program. If there is no match, the high reliability control system 10 can enter a safety state as described above. It should be appreciated that the network 14 illustrated in FIG. 3B enables the safe communication message packets having less safety data than that illustrated in FIG. 3A, thereby increasing the available bandwidth and overall efficiency of the network.

Figure 4A:
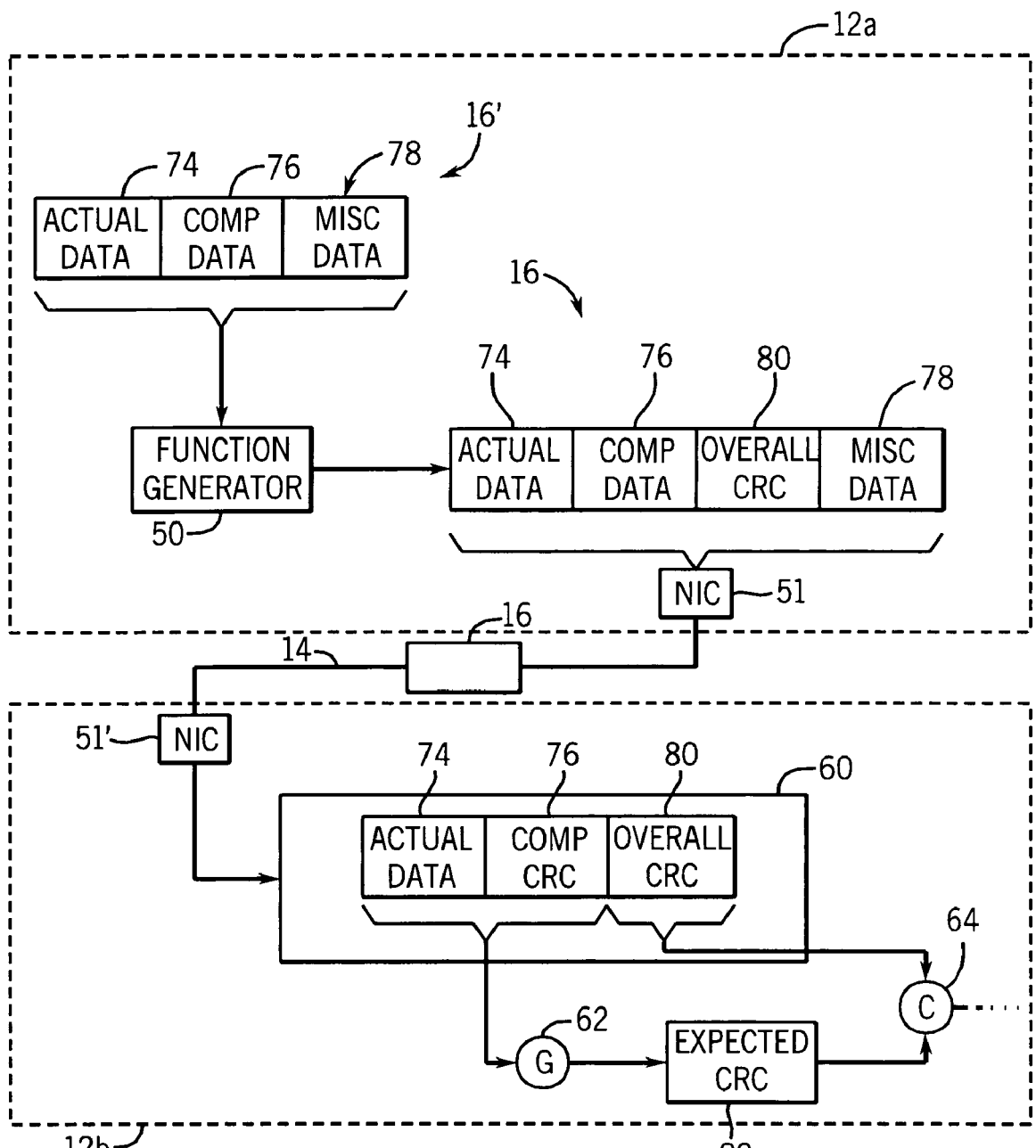
FIG. 4A is a flowchart showing the path of message flow between a producer node and a consumer node in accordance with an alternate embodiment.

Referring now to FIG. 4A, an alternate embodiment recognizes that bandwith can be further reduced while still providing a high reliability network. In particular, a message portion 16' is created including an actual message data 74, complement message data 76, and miscellaneous data 78, as discussed above. Message portion 16' is sent to the function generator 50 of producer node 12a, which generates an error detection code. In accordance with this embodiment, the error detection code comprises a single overall CRC 80 that is a compressed representation of two CRCs related to actual message data 42, as will be described in more detail below. The message 16 is then transmitted to node 12b.

In particular, generator 50 computes a first CRC for the actual message data 42, and a second CRC for the complementary data 46 based on different protocol in the manner described above, and stores the CRCs in a buffer (not shown). The first and second CRC's can alternatively be computed using any of the alternative methods described above with reference to FIG. 3A. Unlike the method illustrated and described above with reference to FIG. 3A, however, the computed first and second CRCs are not communicated over the network 14 to consumer node 12b in accordance with the embodiment illustrated in FIG. 4A. Accordingly, these CRCs are referred to herein as phantom CRCs. Next, the generator 50 computes an overall CRC 80 that can either be a compressed representation of both phantom CRCs only, or a compressed representation of the phantom CRCs along with actual data 74 and complementary data 76, or any combination thereof, using any technique well known to those having ordinary skill in the art. Advantageously, because message 16 includes only a single CRC 80, the resulting message 16 is of a smaller size, thereby increasing the available bandwidth for network 14 while providing high reliability data.

Message 16 is transmitted over the network 14 by producer node 12a via NIC 51, and is received by NIC 51' of consumer node 12b. The actual data 74, complementary data 76, and overall CRC 80 are subsequently stored in buffer 60. CRC 80 is fed into comparator 64, while actual and complementary data 74 and 76, respectively, are received by a generator 62 which computes an expected CRC 82 based on the protocol used to generate overall CRC 80 at the producer node 12a. The expected CRC 82 is forwarded to the comparator 64 and compared to the actual CRC 80. If there is a match, the message 16 is forwarded to the control program. If there is no match, the high reliability control system 10 may enter a safety state which generally provides a shutting down of portions or all of the high reliability industrial control system 10 according to the predefined safety states for its inputs and outputs.

Thus, it will be understood that the benefits of having separate CRCs for actual data and complementary data may be obtained without actual transmission of the CRCs themselves. The control system 10 thus provides a high reliability communications network 14 having a reduced bandwidth compared to conventional networks. Data capacity is thus conserved.

Figure 4B:
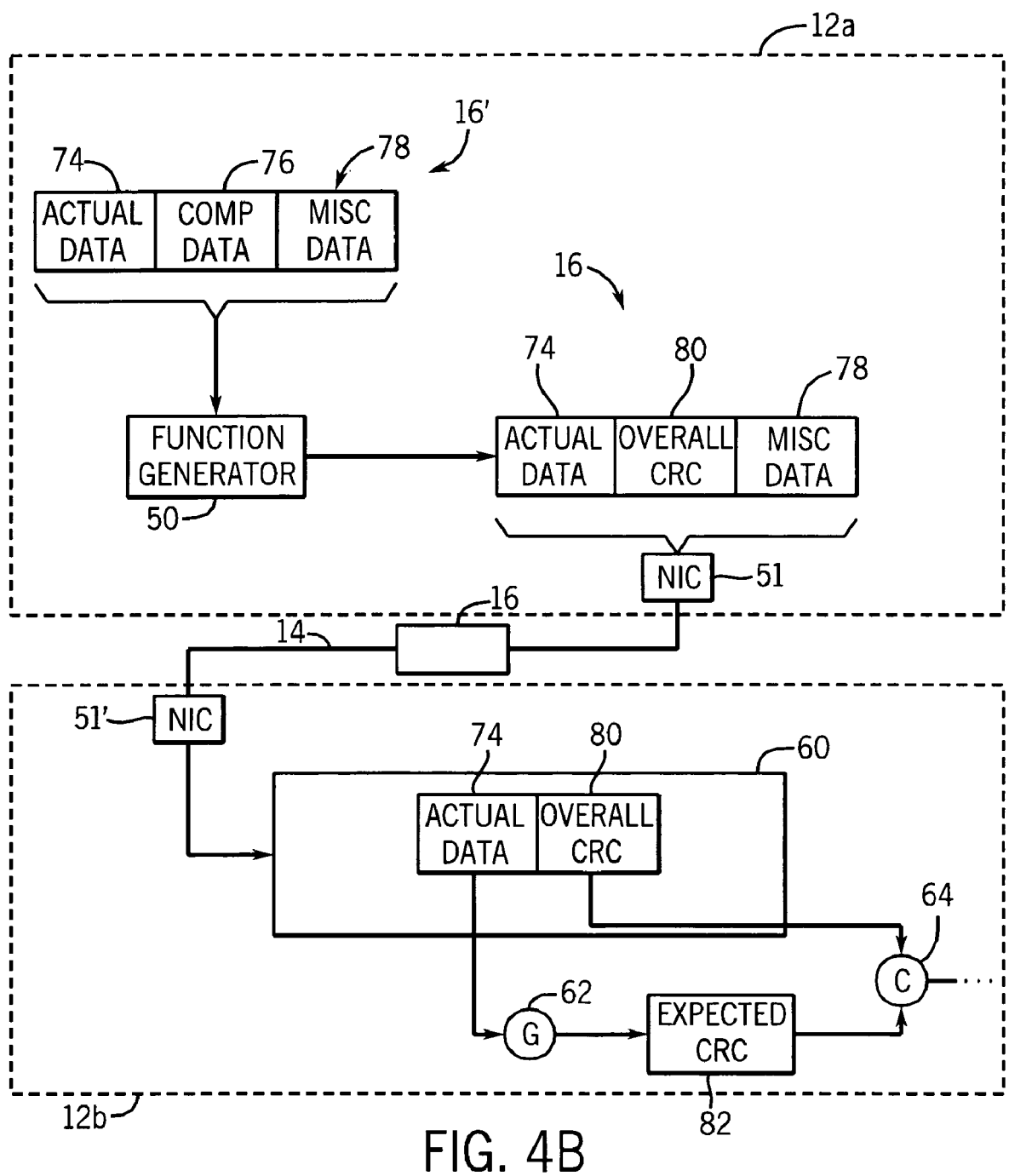
FIG. 4B is a flowchart showing the path of message flow between a producer node and a consumer node in a manner similar to that illustrated in FIG. 4A in accordance with an alternate embodiment.

Referring now to FIG. 4B, the present invention recognizes that the bandwidth of network 14 illustrated in FIG. 4A can further be increased for actual message data by eliminating the transfer of complementary data 76 from the producer node 12a to the consumer node 12b. Rather, producer node 12a produces compiles message portion 16' including actual data 74, comp data 76, and miscellaneous data 78. The function generator 50 receives message portion 16', and calculates the overall CRC based, either directly or indirectly, on the actual data 74 using any of the methods described above. Once the overall CRC is calculated by generator 50, message 16 can be created without complementary data 76. The message 16 is then communicated over network 14 via NIC 51 of producer node 12a, which modifies message 16, typically by adding data according to the particular requirements of the protocol of the network.

The message 16 is received by network interface circuit (NIC) 51' of consumer node 12b, and message sections 74 and 80 are forwarded to buffer 60. The actual message data 74 is then fed into a generator 82, while the overall CRC is forwarded to comparator 64. The generator 62 can determine, based on actual data 74, an expected overall CRC using the same protocol as producer node 12a to calculate overall CRC 80, as described above. The expected CRC is forwarded to comparator 64. The expected CRC is compared against the actual CRC 80. If there is a match, the message 16 is forwarded to the control program. If there is no match, the high reliability control system 10 may enter a safety state, as described above.

It should be appreciated that producer node 1 2a can alternatively communicate message portion 16' to function generator 50 without the complementary data 76, such that only actual data 74 and miscellaneous data 78 are received by the function generator. In this embodiment, the function generator determines the overall CRC 80 using actual data 74 alone. In particular, the first phantom CRC can be determined directly from the actual data 74, and the second phantom CRC can be determined by altering the actual data to achieve virtual complementary data, and apply the second phantom CRC protocol to the virtual complementary data to determine the second phantom CRC. The first and second phantom CRCs are then compressed to provide the overall CRC 80.

It is specifically intended that the present invention not be limited to the embodiments and illustrations contained herein, but include modified forms of those embodiments including portions of the embodiments and combinations of elements of different embodiments as come within the scope of the following claims. For example, the function of the safety error correcting code could be broken into several error correcting codes and a variety of different error correcting code compression systems may be used.

The invention claimed is:

1. A method of communication between a producer node and a consumer node over a high reliability network, the method comprising the steps of:
   (a) preparing a message at the producer node, the message including:
      i. message data;
      ii. a first error detection code (EDC) based on the entirety of the message data using a first protocol; and
      iii. a second EDC based on the entirety of the message data using a second protocol different than the first protocol;
   (b) transmitting the message to the consumer node;
   (c) at the consumer node, receiving the message over the network and calculating;
      i. an expected first EDC based on the entirety of the received message data using the first protocol; and
      ii. an expected second EDC corresponding to the entirety of the received message data using the second protocol; and
   (d) comparing the expected first and second EDCs to the received first and second EDCs to determine whether data had been corrupted during the transmission of the message.

2. The method as recited in claim 1, wherein step (a) further comprises preparing actual message data and complementary message data.

3. The method as recited in claim 2, wherein the first protocol includes providing a compressed representation of the actual message data, and the second protocol includes providing a compressed representation of the complementary message data.

4. The method as recited in claim 3, wherein the first protocol further comprises dividing the actual message data by a first polynomial key, and dividing the complementary message data by a second polynomial key different than the first polynomial key.

5. The method as recited in claim 2, wherein the first protocol further comprises dividing the actual message data by a polynomial key, and dividing the complementary message data by the polynomial key.

6. The method as recited in claim 5, wherein the first and second polynomial keys comprise one of base-16 0x137 and 0x13b.

7. The method as recited in claim 2, wherein the first protocol further comprises dividing the complementary message data by a polynomial key, and the second protocol further comprise dividing the complementary message data by a second polynomial key different than the first polynomial key.

8. The method as recited in claim 1, wherein the first protocol further comprises dividing the message data by a polynomial key, and the second protocol further comprise dividing the message data by a second polynomial key different than the first polynomial key.

9. The method as recited in claim 1, further comprising the step of entering a safety state upon detection of corrupted data.

10. The method as recited in claim 1 wherein the network is selected from the group consisting of: Ethernet, DeviceNet, ControlNet, FireWire or FieldBus.

11. The method as recited in claim 1, wherein the first and second EDCs are generated at the producer node.

12. The method as recited in claim 1, wherein the EDCs comprise cyclic redundancy codes.

13. A method of communication between a producer node and a consumer node over a high reliability network, the method comprising the steps of:
   (a) providing actual message data;
   (b) generating first and second phantom error detection codes (EDCs) being compressed representations related to the actual message data;
   (c) generating an overall EDC as a compressed representation of the first and second phantom EDCs;
   (d) transmitting a message from the producer node to the consumer node, the message including the actual message data and the overall EDC, but not the first and second phantom EDCs;
   (e) at the consumer node, receiving the message over the network and calculating an expected overall EDC; and
   (f) comparing the expected EDC to the received EDC to determine whether data had been corrupted during the transmission of the message.

14. The method as recited in claim 13, wherein step (a) further comprises producing complementary message data that includes a systematic alteration of the actual message data.

15. The method as recited in claim 14, wherein the second phantom EDC is produced based on the complementary message data.

16. The method as recited in claim 15, wherein step (c) further comprises transmitting the complementary message data to the consumer node.

17. The method as recited in claim 16, wherein step (d) further comprises receiving the actual and complementary message data.

18. The method as recited in claim 17, wherein step (d) further comprises: (a) calculating a first expected phantom EDC based on the received actual message data and a second expected phantom EDC based on the received complementary data; and (b) calculating the expected EDC based on the first and second expected phantom EDCs.

19. The method as recited in claim 14, wherein step (b) further comprises generating the first phantom EDC by applying a polynomial to the actual message data, and generating the second phantom EDC by applying the polynomial to the complementary message data.

20. The method as recited in claim 14, wherein step (b) further comprises generating the first phantom EDC by applying a first polynomial to the actual message data, and generating the second phantom EDC by applying a second polynomial to the complementary message data, wherein the second polynomial is different than the first polynomial.

21. The method as recited in claim 20, wherein the first and second polynomials are selected from the group consisting of base-16 0x137 and 0x13b.

22. The method as recited in claim 14, further comprising generating the first phantom EDC by applying a first polynomial to the complementary message data, and wherein the second phantom EDC is produced by applying a second polynomial to the complementary message data.

23. The method as recited in claim 13, further comprising generating the first phantom EDC by applying a first polynomial to the actual message data, and wherein the second phantom EDC is produced by applying a second polynomial to the actual message data.

24. The method as recited in claim 13, further comprising the step of entering a safety state upon detection of corrupted data.

25. The method as recited in claim 13, wherein the network is selected from the group consisting of: Ethernet, DeviceNet, ControlNet, FireWire or FieldBus.

* * * * *